(12) United States Patent
Gardner et al.

(10) Patent No.: US 6,682,599 B2
(45) Date of Patent: Jan. 27, 2004

(54) SYSTEM FOR MANUFACTURING A TRIM PANEL

(76) Inventors: Michael J. Gardner, 16067 S.R. 12 East, Findlay, OH (US) 45840; Dennis Webb, 5234 Mud Pike, Celina, OH (US) 45822

( * ) Notice: Subject to any disclaimer, the term of this patent is extended or adjusted under 35 U.S.C. 154(b) by 0 days.

(21) Appl. No.: 10/119,370

(22) Filed: Apr. 9, 2002

(65) Prior Publication Data

US 2003/0190416 A1 Oct. 9, 2003

(51) Int. Cl.[7] .............................................. B05C 11/04
(52) U.S. Cl. ...................... 118/121; 118/122; 118/123; 118/304; 118/316; 156/578
(58) Field of Search ................................ 118/121, 123, 118/304, 313, 316, 122; 156/77, 78, 578; 427/207.1, 208, 209

(56) References Cited

U.S. PATENT DOCUMENTS

| | | | |
|---|---|---|---|
| 3,030,232 A | * 4/1962 | Morgenstern | 442/374 |
| 3,256,131 A | 6/1966 | Koch et al. | |
| 3,684,250 A | * 8/1972 | Roeser | 366/160.4 |
| 3,816,234 A | 6/1974 | Winfield | 161/160 |
| 4,073,535 A | 2/1978 | Alfter et al. | 296/137 A |
| 4,263,247 A | 4/1981 | Berger et al. | 264/273 |
| 4,350,734 A | 9/1982 | Hammond | 428/308.4 |
| 4,373,057 A | 2/1983 | Hammond | 524/700 |
| 4,400,422 A | 8/1983 | Smith | 428/160 |
| 4,698,252 A | 10/1987 | Koch et al. | 428/159 |
| 5,037,690 A | 8/1991 | van der Kooy | 428/116 |
| 5,114,755 A | * 5/1992 | Canaday et al. | 427/373 |
| 5,352,510 A | * 10/1994 | Laughlin et al. | 428/304.4 |
| 5,486,256 A | 1/1996 | Romesberg et al. | 156/251 |
| 5,549,753 A | * 8/1996 | Matthews et al. | 118/316 |
| 5,942,321 A | 8/1999 | Romesberg et al. | 428/300.7 |
| 6,156,682 A | 12/2000 | Fletemier et al. | 442/394 |

FOREIGN PATENT DOCUMENTS

WO    WO 01/26933 A1    4/2001

OTHER PUBLICATIONS

TAH Industries, Inc., Dispensing Valves For 2–Component Reactive Materials, 6 pages.
TAH Industries, Inc., Motionless Mixers for Adhesives and Sealants, 16 pages, 2000.

\* cited by examiner

*Primary Examiner*—Laura Edwards
(74) *Attorney, Agent, or Firm*—Harness, Dickey & Pierce, P.L.C.

(57) ABSTRACT

A system for manufacturing a trim panel includes a plurality of rollers for routing a foam core of the trim panel along a path. A first doctor blade for applying an adhesive resin is disposed adjacent to the first side of the foam core. A second doctor blade for applying an adhesive resin to the second side of the foam core is disposed adjacent the second side of the foam core. The system further includes a mixing head having an output port. A mixing tube is attached to the output port. The mixing head defines first, second, and third distinct fluid paths for the first, second and third components, respectively. The first, second, and third fluid ports extend to the output port. In use, the system continuously monitors the actual application rate of the adhesive resin and compares this actual application rate to a desired application rate and adjusts the pump output accordingly.

17 Claims, 3 Drawing Sheets

SYSTEM FOR MANUFACTURING A TRIM PANEL

FIELD OF THE INVENTION

The present invention generally relates to laminated panels for motor vehicle uses. More preferably, the present invention relates to a system and a method for manufacturing a laminated panel for a motor vehicle interior. More specifically, but without restriction to the particular embodiment and/or use which is shown and described for purposes of illustration, the present invention pertains to a system for applying an adhesive resin to both sides of a foam core of a laminated panel, an improved mixing head, and a related method of applying a controlled amount of adhesive resin.

BACKGROUND OF THE INVENTION

Various laminated panels are conventionally used within the interior of a motor vehicle. Exemplary uses for such laminated panels include trim panels (i.e., on the doors of the motor vehicle) and headliners. The laminated panels serve dual purposes of providing enhanced occupant comfort and providing an improved appearance.

Known laminated panels for interior motor vehicle uses conventionally include one or more layers of fiberglass and one or more layers of foam that are secured together with adhesive. During manufacture, the adhesive is cured to affix the elements. The resulting laminate is trimmed to a desired shape. One known method for manufacturing a trim panel is shown and described in U.S. Pat. No. 5,942,321 to Romesberg et al., which is hereby incorporated by reference as if fully set forth herein.

The adhesive resins used to secure the various layers of conventional laminated panels typically include one or more polyols and an isocyanate. Additionally, it is known to incorporate a catalyst for certain applications to speed up curing of the adhesive resin. The proportions of the various components of the adhesive resin are varied depending on the materials employed for the laminated panel. The proportions of these components may also need to be varied depending upon the curing temperature, the relative humidity of the air, and other factors known in the industry.

Conventional systems for manufacturing motor vehicle laminated panels include separate geared pumps for pumping each component of the adhesive resin. Adjustment of the proportions of the components of the resin adhesive in such a conventional system requires changing the gears of the pumps. Different gears are typically available to accommodate factors such as high humidity (e.g., during the summer or while it is raining) and low humidity (e.g., during the winter). Such gear changing to accommodate proportional adjustment of the adhesive resin components is labor intensive and is limited by the gearing available.

While known systems and methods for manufacturing motor vehicle laminated panels have proven to be acceptable for their intended applications, they are all associated with certain limitations and/or disadvantages.

SUMMARY OF THE INVENTION

It is a general object of the present invention to provide a system and method for manufacturing a laminated panel for a motor vehicle which overcome the limitations of the prior art, including but not limited to those discussed above.

It is another object of the present invention to provide a system and method for manufacturing laminated panels for motor vehicles which permit adjustments to the rate of adhesive application on the fly.

It is another object of the present invention to provide a system and method for manufacturing laminated panels for motor vehicles of improved efficiency.

Related objects of the present invention include providing a system and method for manufacturing laminated panels for motor vehicles which produce a reduced amount of waste and more accurately apply required adhesives.

It is another object of the present invention to provide a system and method for manufacturing trim panels which reduce in-line crystallization of adhesive components.

It is a more particular object of the present invention to provide a system and method for manufacturing a laminated panel for motor vehicles utilizing first and second polyols that remain unmixed until immediately prior to application.

It is yet another object of the present invention to provide a method and system for manufacturing laminated panels for motor vehicles which incorporate a feedback loop for monitoring the dispersement rate of the various components of an adhesive resin.

According to one aspect, the present invention provides a system for manufacturing a laminated panel having a foam core. The foam core has a first side and an opposing second side. The system includes a plurality of rollers for routing the foam core along a path. A first doctor blade for applying an adhesive resin is disposed adjacent to the first side of the foam core. A second doctor blade for applying an adhesive resin to the second side of the foam core is disposed adjacent the second side of the foam core.

According to another aspect, the present invention relates to a system for applying an adhesive resin to a foam core of a laminated panel. The adhesive resin includes at least a first component, a second component, and a third component. The system includes a mixing tube for mixing the first, second, and third components of the adhesive resin. The system further includes a mixing head having an output port. The mixing tube is attached to the output port. The mixing head defines first, second, and third distinct fluid paths for the first, second and third components, respectively. The first, second, and third fluid ports extend to the output port.

In yet another aspect, the present invention provides a method of applying an adhesive resin to a foam core of a laminated panel. The adhesive resin includes a plurality of components. The method includes the general steps of:

manually inputting a desired application rate for at least a first component of the plurality of components;

varying a voltage delivered to a pump to pump the first component as a function of the desired application rate;

measuring the actual application rate of the first component;

comparing the actual application rate with the desired application rate; and adjusting the voltage delivered to the pump if the actual application rate is not substantially equal to the desired application rate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the subject invention, its application, or uses.

Figure 1:
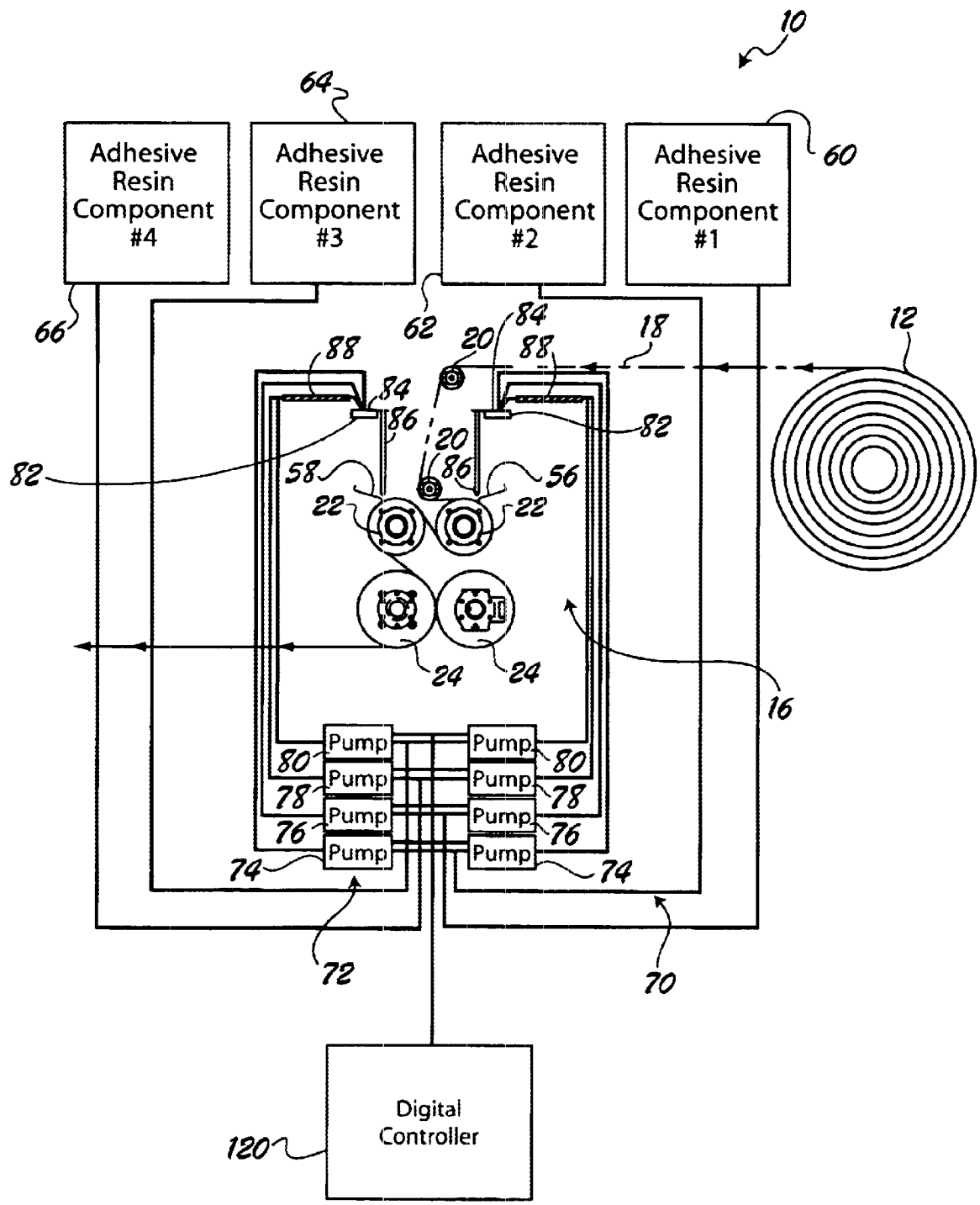
FIG. 1 is a schematic illustration of a system for making a laminated panel constructed in accordance with the teachings of a preferred embodiment of the present invention.

With initial reference to the schematic view of FIG. 1, a system according to a preferred embodiment of the present invention for manufacturing a laminated panel is generally illustrated and identified at reference element 10. As will be described herein, one particular type of laminated panel to be manufactured by the system 10 of the present invention is a motor vehicle interior trim panel. After reading the remainder of this detailed description, it will become apparent to those skilled in the art that the teachings of the present invention are not so limited and extend to various other types of laminated panels, including but not limited to headliners.

Figure 2:
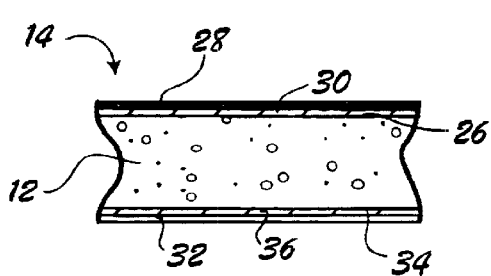
FIG. 2 is a cross-sectional view of a first laminated panel constructed in accordance with the system and method of the present invention.

According to one particular aspect, the present invention relates to the application of an adhesive resin to a core 12 of a laminated panel 14 (shown in cross-section in FIG. 2). In the preferred embodiment, the core is a foam core 12. Alternatively, other materials well known in the art, including but not limited to jute, may be used as the core 12.

The system 10 is illustrated to include a plurality of rollers 16 for routing the foam core 12 along a path 18. In the exemplary arrangement illustrated in FIG. 1, the plurality of rollers 16 is shown to include a pair of idle rollers 20 and a pair of driven rollers 22. The plurality of rollers 16 is further illustrated to include a pair of nip rollers 24.

With reference to FIG. 2, before further describing the system 10 of the present invention, a brief understanding of the construction of an exemplary trim panel 14 is warranted. The trim panel 14 is shown to include the foam core 12. The foam core 12 has a first side 26 bonded to a cover material 28 by a first layer of adhesive resin 30. The trim panel 14 further includes a scrim 32 bonded to a second side 34 of the foam core 12 by a second layer of adhesive resin 36.

Figure 3:
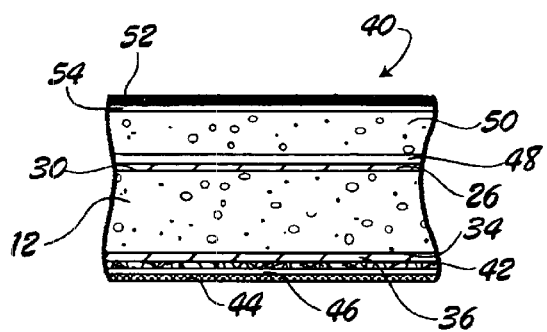
FIG. 3 is a cross-sectional view of a second laminated panel constructed in accordance with the system and method of the present invention.

With reference to the cross-sectional view of FIG. 3, an alternatively constructed trim panel is shown and generally identified at reference element 40. The trim panel 40 includes a first fiberglass layer 42 bonded to the second side 34 of the foam core 12 through the second layer of adhesive resin 36. A scrim 44 is secured to the first fiberglass layer of 42 by an adhesive film 46. A second layer of fiberglass 48 is adhered to the first side 26 of the foam core 12 by the first layer 30 of adhesive resin. An additional layer of foam 50 is secured to the fiberglass layer 48 and to a cover material 52 through layers of adhesive film 54. It will be understood that the fiberglass layers 42 and 48 may be substituted with other known materials having suitable structural integrity.

Referring again to the schematic illustration of FIG. 1, the system 10 of the present invention is further shown to include first and second doctor blades 56 and 58 of conventional construction for applying the adhesive resin to the first and second sides 26 and 32 of the foam core 12, respectively. The doctor blades 56 and 58 are positioned adjacent the first and second sides 26 and 34 of the foam core 12. Significantly, the portions of the foam core 12 adjacent which the doctor blades 56 and 58 are disposed are oriented in a generally horizontal manner to facilitate application of the adhesive resin. Explaining further, the first doctor blade 56 is positioned along the path 18 of the foam core 12 at a point which the first side 26 of the foam core 12 faces generally upward. The second doctor blade 58 is positioned along the path 18 at a point at which the second side 34 of the foam core 12 faces generally upward.

In the particular arrangement illustrated, the foam core 12 initially travels along a generally horizontal path entering the system 10. The path 18 goes around a first of the idle rollers 20 and downwardly progresses to a second of the idle rollers 20. Wrapping around the second idle roller 20, the first side 26 of the foam core 12 is oriented generally upward until it wraps around a first of the driven rollers 22. The second side 34 of the foam core 12 is oriented to face generally upward as the path 18 of the foam core 12 wraps around the second driven roller 22. The pair of nip rollers 24 pull the foam core 12 along the path 18 as it exits the system 10 in a generally horizontal orientation. At this point of exit, the foam core 12 is coated on both sides with the adhesive resin and the remaining components of the trim panel 14 or 40 are assembled. This remaining assembly is conventional insofar as the present invention is concerned.

In the preferred embodiment, the adhesive applied to the sides 26 and 34 of the foam core 12 is identical and includes a plurality of components. In the exemplary embodiment, the adhesive resin includes a first component 60, a second component 62, a third component 64, and a fourth component 66. In one particular application, the first component 66 is an isocyanate. One suitable isocyanate is a polymethylene-polyphenylene ester of isocyanate acid. In this application, the second component 62 is a first polyol and the third component is a second polyol. Suitable polyols are commercially available from Dow Chemical Company under the trade name Varanol. The fourth component 66 is an optional catalyst. A suitable catalyst is available from Dow Chemical Company under the trade name Specflex.

The system 10 is further illustrated to include a first bank of pumps 70 for delivering the components 60–66 to the first side 26 of the foam core 12 and a second bank of pumps 72 for delivering the components 60–66 to the second side 34 of the foam core 12. Both of the banks of pumps 70 and 72 include a first pump 74, a second pump 76, a third pump 78 and a fourth pump 80 respectively corresponding to the first component 60, the second component 62, the third component 64, and the fourth component 66. In the preferred embodiment, each of the pumps 74–80 are constant displacement pumps driven by a variable DC voltage. The pumps 74–80 pump their respective components 60–66 to a mixing head 82. The mixing heads 82 are conventionally mounted for translation along a track 84 which extends parallel to the width of the foam core 12.

Mixing tubes 86 are secured to the mixing heads 82 for mixing the components 60–66 of the adhesive resin and delivering the adhesive resin to the doctor blades 56 and 58 for application to the first and second sides 26 and 34 of the foam core 12, respectively. Insofar as the present invention is concerned, the mixing tubes 86 are conventional in construction. Suitable mixing tubes are commercially available from TAH Industries, Inc. of Robbinsville, N.J.

Figure 5:
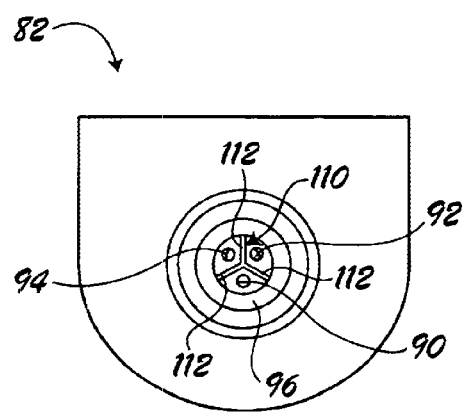
FIG. 5 is a bottom view of a mixing head of the system for manufacturing a laminated panel of the preferred embodiment of the present invention.
Figure 6:
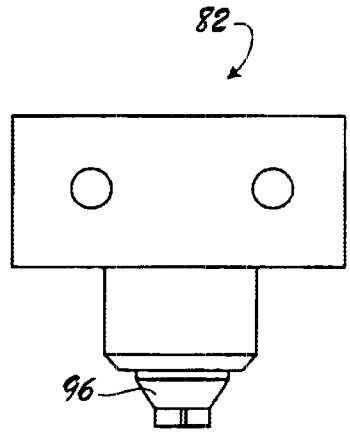
FIG. 6 is a side view of a mixing head of the system for manufacturing a laminated panel of the preferred embodiment of the present invention.

In the exemplary embodiment illustrated, the catalyst of the fourth component 66 and the polyol of the third component 64 are combined at an inline mix tube 88. The inline mix tubes 88 are fluidly connected to an input port 90 of one of the mixing heads 82. The mixing heads 82 are shown in further detail in FIGS. 4–6. The mixing heads 82 include second and third input ports 92 and 94 for receiving the first and second components 60 and 62, respectively. The mixing heads 82 have an output port 96. The output ports 96 of the mixing heads 82 have a generally circular cross-section. The mixing tubes 86 are secured to the output ports 96.

Figure 4:
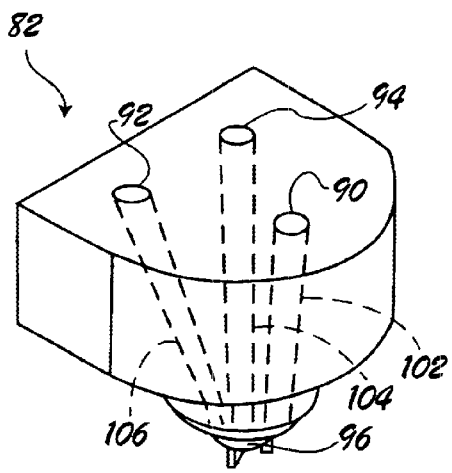
FIG. 4 is a perspective view of a mixing head of the system for manufacturing a laminated panel of the preferred embodiment of the present invention.

In the preferred embodiment, the mixing heads 82 define first, second and third distinct fluid paths 102–106 (shown in FIG. 4 in phantom lines). The distinct fluid paths 102–106 extend through to the output port 96. With the exception of the combination of the third component 64 and the fourth component 66, the components of the adhesive resin remain separated until introduction into the mixing tubes 86. In this manner, crystallization which may occur through premature mixing of the polyols of the second and third components 62 and 64 is eliminated.

The mixing heads 82 preferably include a divider member 110 for maintaining the first, second and third 102–106 fluid paths. The divider member 110 includes three generally planar members 112 which intersect at a cross-sectional center of the output port 96. In the exemplary embodiment, the planar members 112 are spaced apart from one another approximately 120°.

Figure 7:
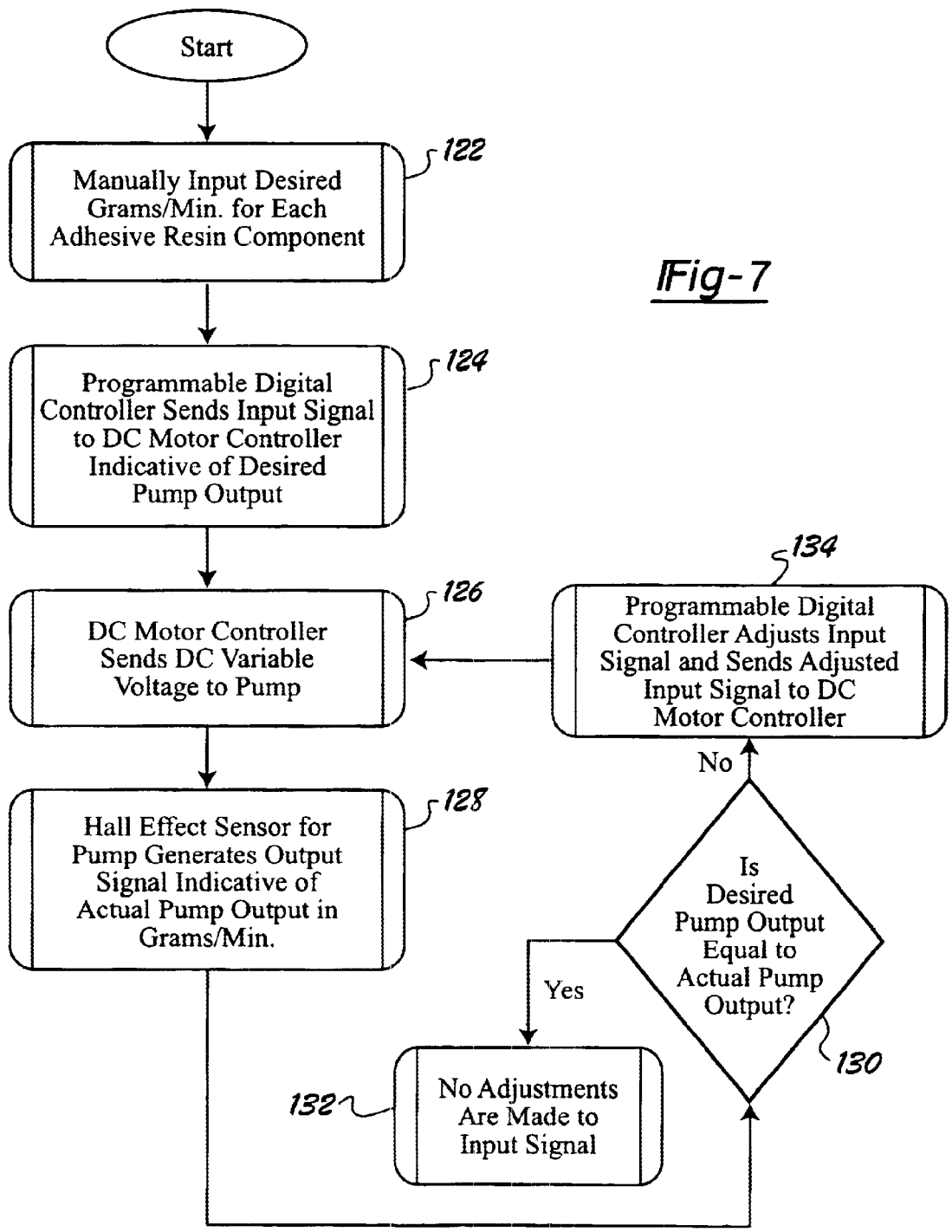
FIG. 7 is a flow diagram illustrating the general steps applied to control the application of adhesive to a foam layer as part of the preferred method of the present invention.

With continued reference to the schematic view of FIG. 1 and particular reference to the flow diagram of FIG. 7, a preferred manner of controlling the rates of application of the components 60–66 of the adhesive resin will be described. The system 10 is illustrated to include a programmable digital controller 120 for controlling the pumps 74–80. Based upon a desired amount of adhesive resin to be applied to the sides 26 and 34 of the foam core 12 and the desired ratios of the components 60–66, a desired application rate for each component 60–66 is calculated. Such a calculation factors in the width of adhesive resin application to the foam core 12 and the linear feed rate of the foam core 12. In a first general step 122, a desired application rate is manually inputted into the digital controller 120 for each component 60–66. In one application, the desired application rates for the component 60–66 are inputted in terms of grams per minute.

At a second general step 124, the programmable digital controller 120 generates an input signal indicative of the desired application rate or desired pump output for each of the pumps 74–80 and sends the input signals to a DC motor controller associated with the pumps 74–80. In a third general step 126, the DC motor controllers function to deliver a variable voltage to the pump 74–80 so as to pump the components 60–66 of the adhesive resin in accordance with the desired application rates.

In the preferred embodiment, the system 10 of the present invention preferably incorporates closed loop monitoring of the actual application rates of the components 60–66 of the adhesive resin. As shown in FIG. 7, at a fourth general step 128, the actual application rate of the component 60–66 is measured. In a preferred manner, the actual application rates are measured by a sensor which monitors the RPMs of the constant displacement pumps 74–80. These sensors generate an output signal indicative of the actual pump output of the components 60–66 of the adhesive resin. In one application, the sensors are hall effect sensors. Alternatively, the sensors may be optical sensors or other types of sensors well known in the art.

In a fifth general step 130, the actual pump output or application rate is compared to the desired pump output or desired application rate. If the desired pump outputs are equal to the actual pump outputs, the logic proceeds to step 132 and no adjustments are made to the input signal. If the desired pump output is not equal to the actual pump output, the logic continues to step 134 and the programmable digital controller 120 adjusts the input signal. This adjusted input signal is sent to the DC motor controller and the closed loop monitoring of the system 10 of the present invention returns to step 126. For purposes of step 130, it will be understood that the desired pump output is equal to the actual pump output if the differences between the two is below a predetermined value.

The system 10 of the present invention allows for the various components 60–66 of the adhesive resin to be monitored through continuous production. In this manner, the system 10 is capable of automatically accommodating for various factors which conventionally have adversely affected production quality. These factors include humidity, temperature and the like. Additionally, the system 10 of the present invention allows for adjustments to the application rates of the various components 60–66 to be made "on-the-fly". Such changes may be desirable during a run if the type of trim panel 14 to be produced is changed, if the width of the adhesive resin to be applied to the foam core 12 is adjusted, or various other circumstances.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for manufacturing a laminated panel having a foam core, the foam core having a first side and an opposing second side, the system comprising:

a plurality of rollers for routing the foam core along a path;

a first doctor blade for applying an adhesive resin to the first side of the foam core is disposed adjacent to the first side of the foam core;

a second doctor blade for applying the adhesive resin to the second side of the foam core;

a mixing head for delivering the adhesive to at least one of the first and second doctor blades, the mixing head defining first, second and third distinct fluid paths for first, second and third components of the adhesive, respective.

2. The system for manufacturing a laminated panel having a foam core of claim 1, wherein the first doctor blade is constructed and arranged adjacent the path at a first point at which the first side of the foam core faces generally upward and the second doctor blade is constructed and arranged adjacent the path at a second point at which the second side of the foam core faces generally upward.

3. The system for applying an adhesive resin to a foam core of a laminated panel of claim 1, further comprising a pump for delivering a first component of the adhesive resin to at least one of the first and second doctor blades.

4. The system for applying an adhesive resin to a foam core of a laminated panel of claim 3, further comprising a DC motor controller for varying an actual output of the pump.

5. The system for applying an adhesive resin to a foam core of a laminated panel of claim 4, further comprising a programmable digital controller for generating an input signal indicative of a desired application rate for the first component and sending the input signal to the DC motor controller.

6. The system for applying an adhesive resin to a foam core of a laminated panel of claim 5, further comprising a sensor for measuring an actual rate of the first component being pumped from the pump.

7. The system for applying an adhesive resin to a foam core of a laminated panel of claim 3, wherein the pump is a constant displacement pump.

8. The system for applying an adhesive resin to a foam core of a laminated panel of claim 4, further comprising a closed loop monitoring arrangement for continuously comparing the desired application rate with the actual application rate.

9. The system for applying an adhesive resin to a foam core of a laminated panel of claim 5, wherein the programmable digital controller is operative to send an adjusted input signal to the DC motor controller in response to a difference between the actual and desired input rates.

10. The system for manufacturing a laminated panel having a foam core of claim 2, further comprising a pair of drive rollers disposed between the first and second doctor blades, the pair of drive rollers oriented relative to one another such that the pair of drive rollers invert the foam core and position the first and second points substantially in a common horizontal plane.

11. The system for manufacturing a laminated panel having a foam core of claim 2, wherein the mixing head includes a divider member separating the first, second and third distinct fluid paths.

12. A system for applying an adhesive resin to a foam core of a laminated panel, the adhesive resin including at least a first component, a second component and a third component, the system comprising:

a mixing tube for mixing the first, second, and third components of the adhesive resin; and a mixing head having an output part, the mixing tube attached to the output port, the mixing head defining first, second and third distinct fluid paths for the first, second and third components, respectively, the first, second and third fluid paths extending to the output port;

wherein the mixing head includes a divider member separating the first, second and third fluid paths.

13. The system for applying an adhesive resin to a foam core of a laminated panel of claim 12, wherein the first component is an isocyanate, the second component is a first polyol, and the third component is a second polyol.

14. The system for applying an adhesive resin to a foam core of a laminated panel of claim 13, wherein the adhesive resin further includes a catalyst.

15. The system for applying an adhesive resin to a foam core of a laminated panel of claim 12, wherein the output port has a generally circular cross-section.

16. The system for applying an adhesive resin to a foam core of a laminated panel of claim 15, wherein the divider member includes three generally planar members which intersect at a cross-sectional center of the output port.

17. The system for applying an adhesive resin to a foam core of a laminated panel of claim 16, wherein the three generally planar members are spaced apart from one another approximately 120°.

* * * * *